United States Patent
Young et al.

[11] Patent Number: 5,905,956
[45] Date of Patent: May 18, 1999

[54] METHOD FOR IDENTIFYING ACTIVE HANDSETS IN A CORDLESS TELEPHONE SYSTEM

[75] Inventors: Jason T. Young, Lake Villa; Sybren D. Smith, Fox Lake; Michael A. Silvestri, Lake Bluff, all of Ill.

[73] Assignee: Motorola, Inc., Schuamburg, Ill.

[21] Appl. No.: 08/668,671

[22] Filed: Jun. 25, 1996

[51] Int. Cl.⁶ .................................................. H04Q 7/20
[52] U.S. Cl. ........................... 455/435; 455/463; 455/450
[58] Field of Search ..................... 455/435, 428, 455/426, 450, 555, 463, 465, 566, 405, 425, 424

[56] References Cited

U.S. PATENT DOCUMENTS

| | | | |
|---|---|---|---|
| 4,710,596 | 12/1987 | Kurokawa | 379/424 |
| 4,940,974 | 7/1990 | Sojka | 455/450 |
| 5,103,448 | 4/1992 | Barnes et al. | 370/29 |
| 5,121,863 | 6/1992 | Kotitalo et al. | 224/42.45 |
| 5,193,209 | 3/1993 | Maeda et al. | 455/528 |
| 5,343,512 | 8/1994 | Wang et al. | 455/428 |
| 5,406,617 | 4/1995 | Bauer | 379/61 |
| 5,509,052 | 4/1996 | China et al. | 455/435 |
| 5,517,551 | 5/1996 | Arai | 455/554 |
| 5,550,907 | 8/1996 | Carlsen | 455/566 |
| 5,579,535 | 11/1996 | Orlen et al. | 455/426 |

FOREIGN PATENT DOCUMENTS

| | | |
|---|---|---|
| 0 593 055 A1 | 4/1994 | European Pat. Off. . |
| 0 673 123 A1 | 9/1995 | European Pat. Off. . |
| 0 751 043 A1 | 1/1997 | European Pat. Off. . |

*Primary Examiner*—Edward F. Urban
*Assistant Examiner*—Ticahon Gesesse
*Attorney, Agent, or Firm*—John G. Rauch

[57] ABSTRACT

A method and apparatus provides an indication of active handsets in a cordless telephone system (100). A user enters an inquiry (204) using either a handset (104) or the user interface (120) of the base station (102). The base station (102) pings or queries (210) each registered handset (106, 108, 110, 112) to establish a list of active handsets. The list of active handsets is then transmitted (228) to the handset (104) from which the inquiry was received or is displayed using the user interface (120) of the base station (102). This permits the user to learn what other users are actively registered with the base station (102) for call forwarding, intercom operation or for use of any other user convenience features of the cordless telephone system (100).

14 Claims, 2 Drawing Sheets

METHOD FOR IDENTIFYING ACTIVE HANDSETS IN A CORDLESS TELEPHONE SYSTEM

FIELD OF THE INVENTION

The present invention relates generally to cordless telephone systems. The present invention relates more particularly to a method for identifying active handsets in a cordless telephone system.

BACKGROUND OF THE INVENTION

Modern cordless telephone systems provide for multiple handsets operating in conjunction with a single base station. The base station couples to a wire line telephone network. The base station also includes radio circuitry for communicating with the cordless handsets. The handsets include similar radio circuitry for communicating with the base station. Examples of such cordless telephone systems are systems operated according to the Digital European Cordless Telephone (DECT) standard, or systems operated according to the Personal Handy Phone system (PHS) in Japan.

Such systems provide numerous user convenience features which make use of this multiple handset capability. For example, the system supports calling from handset to handset, or call transfer between handsets, or paging between handsets, or handset-to-handset intercom features. These features are implemented using the base station as a common communication link, or may be implemented using direct communication between handsets. These features are available in systems in which the base station may be used as a hands free speakerphone or includes a corded handset for communication between the base station and a handset.

One problem occurring when using these user convenience features is the inability to know what other users or handsets are actively registered with the base. For example, a user answering an incoming call needs to know if the user for whom the call is intended is actively available in the system before transferring the call. Similarly, before intercom operation, a user would like to first determine if the other user is actively registered. However, current cordless telephone systems lack such capability.

Accordingly, there is a need in the art for a cordless telephone system which permits identification of active handsets prior to communication between handsets or communication between a handset and the base station.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
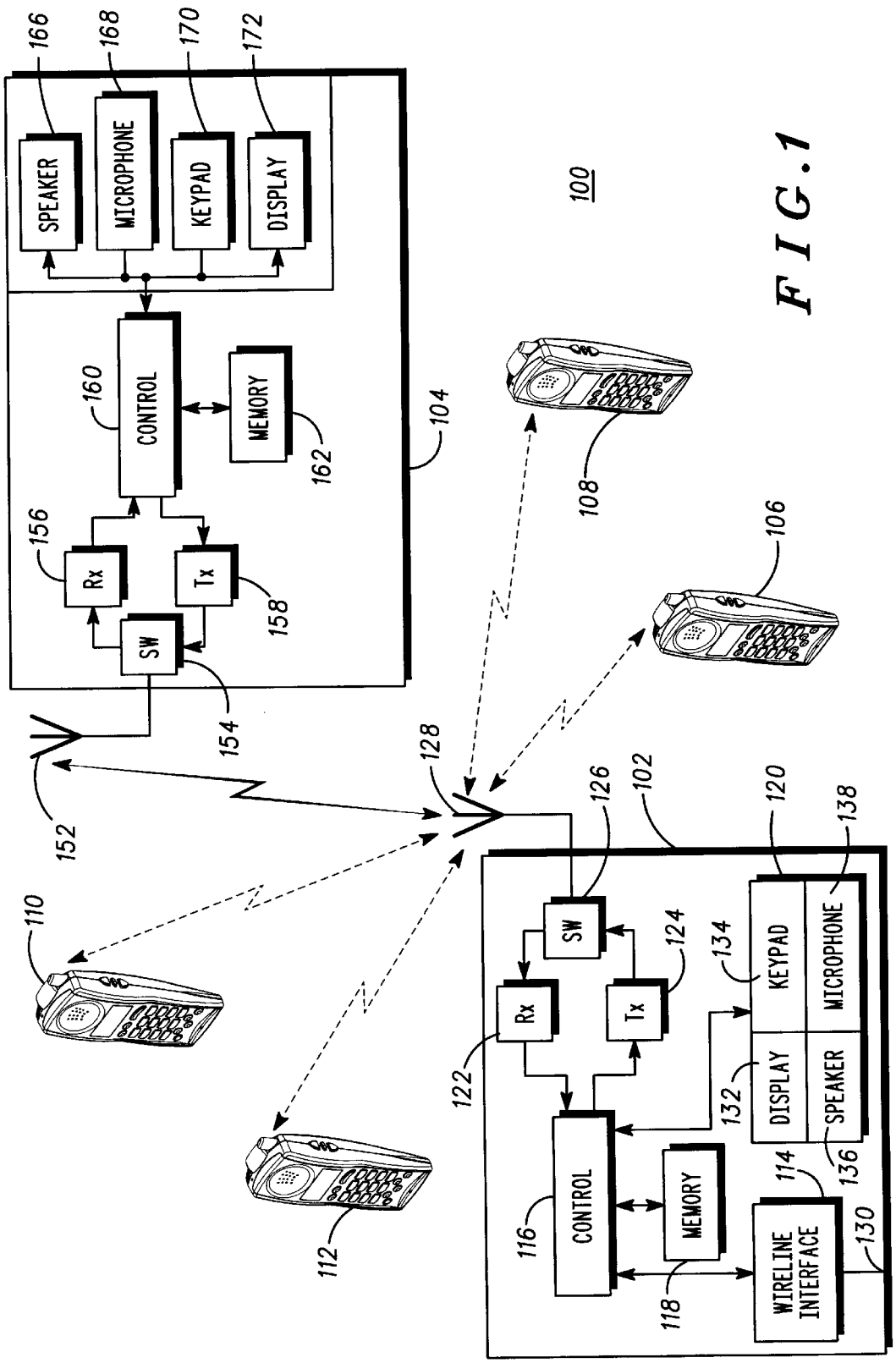
FIG. 1 is an operational block diagram of a cordless telephone system with which the present invention may be used.

Referring now to FIG. 1, a cordless telephone system 100 includes a base station 102 and a plurality of handsets, such as handset 104, handset 106, handset 108, handset 110 and handset 112. The cordless telephone system 100 may include any number of handsets and the number illustrated in FIG. 1 is arbitrarily chosen to illustrate one embodiment of such a system. The cordless telephone system 100 is configured for radio communication between the base station 102 and each of the plurality of handsets. Radio communication occurs according to a standard protocol. Examples of such a standard protocol include the Digital European Cordless Telephone (DECT) protocol or the Personal Handy Phone system (PHS) protocol.

The base station 102 provides an interface between radio communication with the plurality of handsets and wire line communication with a telephone network. The base station 102 includes a wire line interface 114, a controller 116, a memory 118, a user interface 120, a receive circuit 122, a transmit circuit 124, an antenna switch 126 and an antenna 128. The wire line interface 114 is coupled to an input 130 which is configured for coupling to a telephone network. The wire line interface 114 provides functions such as tone generation for dual tone, multi-frequency (DTMF) dialing and detection of an incoming ringing signal from the telephone network. The wire line interface 114 also communicates signals representative of speech between the telephone network and the controller 116.

The controller 116 controls the operation of the base station 102. The controller 116 may be any suitable processor or microcontroller. The controller 116 stores data in the memory 118 and operates in response to data in instructions stored in the memory 118. The base station 102 includes numerous control connections which couple the controller 116 and other elements of the base station 102. Not all of these control connections are shown in FIG. 1 so as to not unduly complicate the drawing figure.

The user interface 120 includes a display 132, a keypad 134, a speaker 136 and a microphone 138. The display 132 is any suitable display, such as a liquid crystal display (LCD) or light emitting diode (LED) display. The keypad 134 includes a standard telephone keypad and may include other function keys as well. The user interface 120 provides operation of the base as a hands free speakerphone using the speaker 136 and the microphone 138 and provides dialing and operation of the base station 102 using the display 132 and the keypad 134. For some applications, the base station 102 may omit the user interface 120, for example in less expensive or low tier cordless telephone models.

The receiver circuit 122 and the transmitter circuit 124 provide radio communication for the base station with one or more handsets of the plurality of handsets. Upon reception of RF signals, the base station 102 receives radio frequency (RF) signals through the antenna 128. The antenna 128 converts the RF signals into electrical baseband signals. The receiver circuit 122 demodulates the electrical baseband signals, recovers the data transmitted on the RF signals and produces a serial data stream. This serial data stream is converted to clocked data and is provided to the controller 116. The controller 116 formats the data into recognizable voice or information for use by the user interface 120 or for transmission to the wire line interface 114. The user interface 120 communicates the received information or voice to a user. Similarly, the wire line interface 114 communicates the received information or voice to the telephone network.

Upon transmission of radio frequency (RF) signals from the base station 102, the controller 116 receives user input data from the user interface 120 and receives wire line information from the wire line interface 114. The controller 116 formats the information obtained from the user interface 120 and conveys it to the transmitter circuit 124 for conversion into modulated RF signals. The transmitter circuit 124 conveys the RF modulated signals to the antenna 128 for transmission to the base station 102. The antenna switch 126 selectively couples either the receiver circuit 122 or the transmit circuit 124 to the antenna 128.

Each handset of the plurality of handsets includes similar radio circuitry for communicating with the base station 102. Structure and operation of a handset in conjunction with the base station 102 will be described using handset 104 as an example. However, handset 106, handset 108, handset 110 and handset 112 are preferably substantially identical to handset 104.

The handset 104 includes an antenna 152, an antenna switch 154, a receiver circuit 156, a transmitter circuit 158, a controller 160, a memory 162 and a user interface 164. Upon reception of RF signals from the base station 102, the handset 104 receives the RF signals through the antenna 152. The antenna 152 converts the RF signals into electrical baseband signals. The receiver circuit 156 demodulates the electrical baseband signals, recovers the data transmitted on the RF signals and provides clocked data to the controller 160. The controller 160 formats the data into recognizable voice or information for use by the user interface 164. The user interface 164 communicates the received information or voice to a user.

The user interface 164 includes a speaker 166, a microphone 168, a keypad 170, and a display 172. The keypad 170 includes a standard telephone keypad and may include other function keys as well. The display is preferably a multiple line liquid crystal display (LCD), but may be any type of suitable display such as a light emitting diode (LED) display. The display may also include other visual indicators, such as LED indicators which selectively illuminate to provide user information.

Upon transmission of radio frequency (RF) signals from the handset 104 to the base station 102, the user interface 164 transmits user input data to the controller 160. The controller 160 formats the information obtained from the user interface 164 and transmits it to the transmitter circuit 158 for conversion into modulated RF signals. The transmitter circuit 158 conveys the RF modulated signals to the antenna 152 for transmission to the base station 102.

Figure 2:
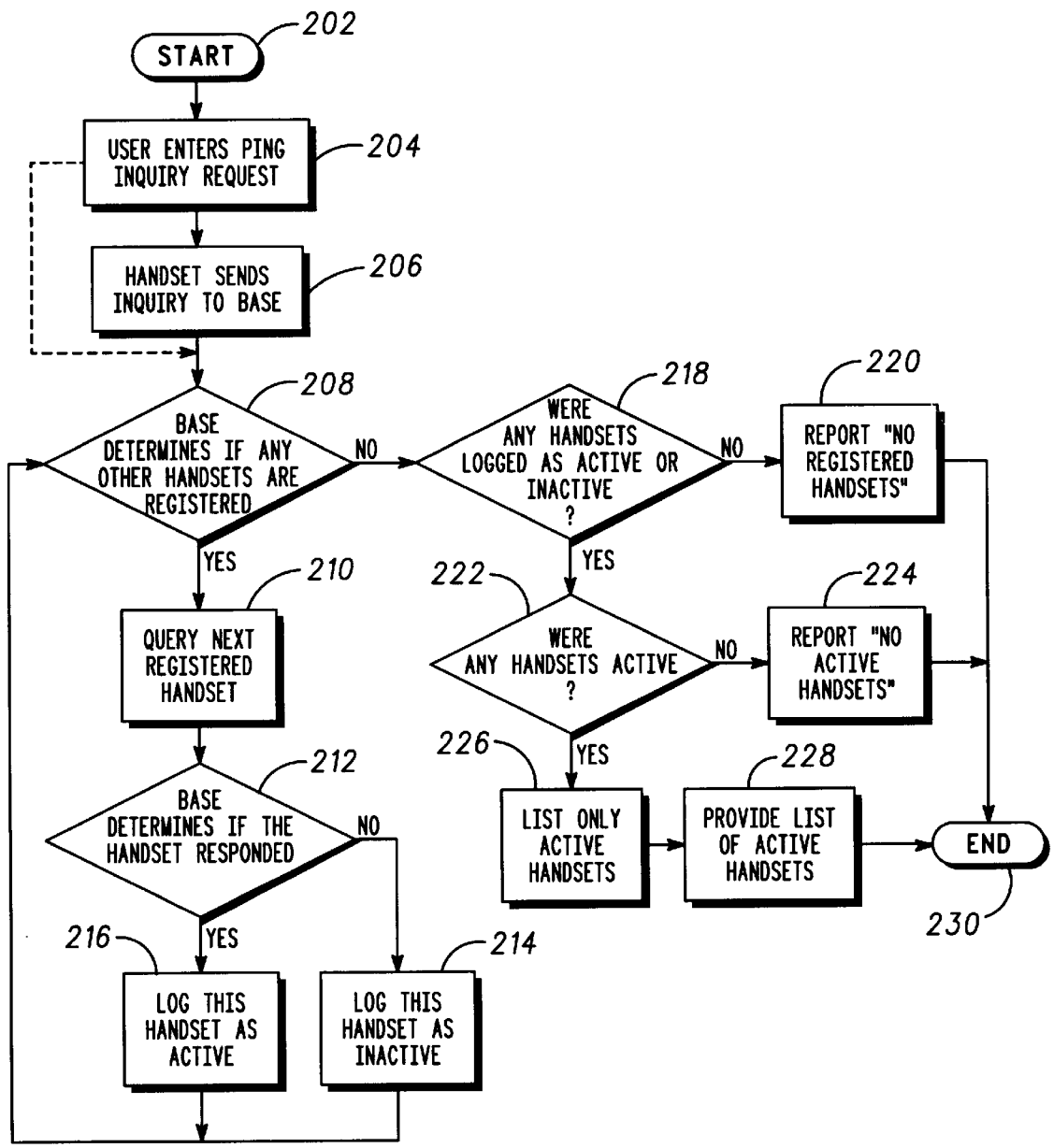
FIG. 2 is a flow diagram illustrating operation of the cordless telephone system of FIG. 1 according to the present invention.

FIG. 2 is a flow diagram illustrating operation of the cordless telephone system 100 of FIG. 1 in accordance with the present invention. The method for identifying active handsets in a cordless telephone system begins at step 202. At step 204, a user enters a ping inquiry request. As used herein, "ping" refers to the process of determining what other handsets are currently actively registered with the base station. The user may enter the ping inquiry using the keypad 134 of the base station 102 (FIG. 1). In this case, execution continues at step 208. Alternatively, the user may enter the ping inquiry using the keypad 170 of a first handset, such as handset 104. In this case, execution continues at step 206, which includes transmitting an inquiry from the first handset to the base station and receiving the inquiry from the first handset; execution then continues at step 208.

At step 208, the method enters a loop including steps 208, 210, 212, 214, and 216 for establishing at the base station a list of active handsets. In this loop, the method includes the steps of transmitting a handset query to each handset on a list of registered handsets, detecting a response to the handset query and including on a list of active handsets only handsets from which a response was received.

A handset actively registers with the base station every time the handset comes within range of the base station or every time the handset is turned on within range of the base station. The base station 102 maintains a list of registered handsets in the memory 118 (FIG. 1). Registration permits the base station to track which handsets are available for receiving an incoming call. The registration process may also establish radio frequency and time slot assignments for communication between the base station and the handset.

At step 208, the base station determines if any handsets are registered with the base station. If no handsets are registered with the base station, execution continues at step 218, which will be described in further detail below. If no handsets are registered with the base station, the test of step 218 will fail and, at step 220, the base station reports that there are no registered handsets. In the case where the ping inquiry was received from the first handset, the base station transmits a none registered signal to the first handset. If the first handset includes a display, such as display 172 of handset 104 (FIG. 1), the method includes the step of producing on the display a none registered indication in response to the none registered signal received from the base station. This indication may be a text message displayed on an LCD or LED display, or an illuminated LED, for example.

If there are one or more handsets registered at the base station, the base station transmits a handset query to each handset on the list of registered handsets. After transmitting the handset query to one handset, the base station detects a response to the query at step 210. The handset query and the response may be of any suitable form of radio communication between base station and handset, using any suitable protocol. What is required is that the handset receive and recognize the handset query and, in response, prepare and transmit the response. The response provides an indication to the base station that the handset is active. As used herein, an active handset is a handset that is powered on and is within range of the base station for radio communication.

At step 212, the base station determines if the handset responded to the handset query. The base station waits for a predetermined time to receive a response. One possible predetermined time period is two frame periods, if the base station and handset communicate using a time division, multiple access protocol in which radio communication occurs over predefined time frames. Use of two frame periods permits the handset to receive the handset query and transmit a response.

At step 214, if the base station did not receive a response, the base station logs as inactive each handset not responding to the handset query. At step 216, if the base station received a response, the base station logs as active each handset responding to the handset query.

Control returns to step 208 to determine if any other handsets are registered. If the list of registered handsets includes one or more additional handsets, the loop including steps 210, 212, 214 and 216 will be repeated until the base station has transmitted handset queries to all registered handsets and logged them as either active or inactive handsets.

When all handsets have been processed, at step 218 it is determined if any handsets were logged as active or inactive. This condition will be true if there were any registered handsets and execution will continue at step 222. This condition will not be true, as noted above, if there are no registered handsets, in which case execution continues at step 220.

At step 222, the base station determines if any handsets were logged as active. If not, this indicates that at least one handset has registered with the base but that it did not respond to the handset query. This condition could arise if that handset has been turned off or is out of range of the base station. If no handsets are logged as active and one or more handsets is logged as inactive, the base station reports that there are no active handsets in step 224. If the ping inquiry was received from a first handset, the base station transmits a none active signal to the first handset. In response to the none active signal, the first handset produces on its display an indication that there are no active handsets. This may be a text message on a LCD or LED handset or may be an illuminated LED. If the ping inquiry was entered using the keypad 134 of the base station 102 (FIG. 1), the base station provides a none active indication if no handsets are logged as active. The base station produces on its display a text message or an illuminated LED or some other indication that there are no active handsets.

If, at step 222, the base station determines that one or more handsets were logged as active, control proceeds to step 226. There, the base station establishes a list of active handsets. The list of active handsets is maintained in the memory 118 of the base station 102 (FIG. 1). At step 228, the base station provides an indication of active handsets using the list of active handsets. If the ping inquiry was received from the one handset, the base station transmits the list of active handsets, or a signal indicative of the list of active handsets, to the first handset. If the first handset includes a display, such as display 172 of handset 104 (FIG. 1), the handset in step 224 displays the list of active handsets on the display. For example, the list might be a list of handset identification numbers or other designators which are meaningful to the user. Alternatively, the list might be a list of the names of other users to whom the other handsets in the system are assigned. If the base station includes a keypad and a display and the ping inquiry was entered using the keypad of the base station, the base station in step 224 displays a display list of active handsets on the display in response to the indication of active handsets. The method then ends at step 230.

As can be seen from the foregoing, the present invention provides a method and apparatus for providing an indication of active handsets in a cordless telephone system. A user enters a ping inquiry using either a handset or the user interface of the base station. The base station pings or queries each registered handset to establish a list of active handsets. The list of active handsets is then transmitted to the handset from which the ping inquiry was received or is displayed using the user interface of the base station. This permits the user to learn what other users are actively registered with the base station 102 for call forwarding, intercom operation or for use of any other user convenience features of the cordless telephone system.

While a particular embodiment of the present invention has been shown and described, modifications may be made. For example, the steps of logging active and inactive handsets may be omitted and the list of active handsets established upon receiving a response to the handset query. In addition, the method may be extended to a cordless telephone system using a public base station which communicates with other public base stations to provide handoff of active telephone calls. It is therefore intended in the appended claims to cover all such changes and modifications which fall within the true spirit and scope of the invention.

What is claimed is:

1. A method for identifying active handsets in a cordless telephone system, the cordless telephone system including a base station and a plurality of handsets configured for radio communication with the base station, the method comprising the steps of:

in response to a user input, transmitting an inquiry about active handsets in the cordless telephone system from a first handset to the base station;

at the base station, establishing a list of active handsets;

transmitting the list of active handsets from the base station to the first handset and at the first handset, producing an indication for the user of the list of active handsets.

2. A method as recited in claim 1 wherein the base station maintains a list of registered handsets and wherein the method further comprises the steps of:

transmitting a handset query to each handset on the list of registered handsets;

detecting a response to the handset query; and including in the list of active handsets only handsets from which a response was received.

3. A method as recited in claim 2 further comprising the steps of:

determining if any handsets are registered with the base station; and if no handsets are registered with the base station, transmitting a none registered signal to the first handset.

4. A method as recited in claim 3 where the step of determining if any handsets are registered with the base station comprises the steps of:

transmitting a handset query to each handset on the list of registered handsets;

logging as active each handset responding to the handset query; and logging as inactive each handset not responding to the handset query.

5. A method as recited in claim 4 wherein the method further comprises the steps of:

if no handsets are logged as active and one or more handset is logged as inactive, transmitting a none active signal to the first handset; and producing an indication at the first handset in response to the none active signal.

6. A method as recited in claim 3 wherein the first handset includes a display and wherein the method further comprises the step of producing on the display an indication in response to the none registered signal.

7. A method as recited in claim 1 wherein the first handset includes a display and wherein the method further comprises the step of displaying the list of active handsets on the display.

8. A method as recited in claim 7 wherein displaying the list of active handsets comprises displaying handset identification numbers.

9. A method as recited in claim 7 wherein displaying the list of active handsets comprises displaying a list of names of other users to whom handsets on the list of active handsets are assigned.

10. A method for providing to a user an indication of active handsets in a cordless telephone system, the cordless telephone system including a base station and a plurality of handsets, the method including the steps of:

at the base station, in response to an inquiry, transmitting a handset query to each handset;

detecting a response to the handset query;

logging as active each handset responding to the handset query, establishing a list of active handsets; and providing to the user the indication of active handsets in response to the list of active handsets.

11. A method as recited in claim 10 wherein the base station includes a keypad and a display and wherein the method further comprises the steps of:

entering the inquiry using the keypad; and displaying a display list of active handsets on the display in response to the indication of active handsets.

12. A method as recited in claim 10 further comprising the steps of:

at the base station, receiving the inquiry from a first handset; and transmitting a signal indicative of the list of active handsets to the first handset in response to the indication of active handsets.

13. A method as recited in claim 10 further comprising the step of providing a none registered indication if no handsets are registered.

14. A method as recited in claim 10 further comprising the step of providing a none active indication if no handsets are logged as active.

* * * * *